(12) United States Patent
O'Donnell et al.

(10) Patent No.: US 6,571,335 B1
(45) Date of Patent: May 27, 2003

(54) SYSTEM AND METHOD FOR AUTHENTICATION OF OFF-CHIP PROCESSOR FIRMWARE CODE

(75) Inventors: Amy O'Donnell, Chandler, AZ (US); George Thangadurai, Santa Clara, CA (US); Anand Rajan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/282,948

(22) Filed: Apr. 1, 1999

(51) Int. Cl.[7] .................. G06F 11/30; G06F 12/14
(52) U.S. Cl. ............... 713/173; 713/156; 713/161; 713/172; 713/187; 713/189
(58) Field of Search ................... 713/1, 100, 156, 713/161, 164, 165, 167, 172, 173, 174, 176, 187, 189, 200, 201, 202, 170; 709/100; 705/65, 66, 67; 712/227, 228; 714/38

(56) References Cited

U.S. PATENT DOCUMENTS

| | | | |
|---|---|---|---|
| 4,578,531 A | 3/1986 | Everhart et al. | 178/22.08 |
| 5,142,579 A | 8/1992 | Anderson | 380/30 |
| 5,214,702 A | 5/1993 | Fischer | 380/30 |
| 5,231,666 A | 7/1993 | Matyas | 380/25 |
| 5,473,692 A | 12/1995 | Davis | 380/25 |
| 5,539,828 A | 7/1996 | Davis | 380/50 |
| 5,568,552 A | 10/1996 | Davis | 380/4 |
| 5,751,809 A | 5/1998 | Davis et al. | 380/23 |
| 5,796,840 A | 8/1998 | Davis | 380/50 |
| 5,802,277 A * | 9/1998 | Cowlard | 713/200 |
| 5,805,706 A | 9/1998 | Davis | 380/49 |
| 5,805,712 A | 9/1998 | Davis | 380/50 |
| 5,818,939 A | 10/1998 | Davis | 380/49 |
| 5,825,879 A | 10/1998 | Davis | 380/5 |
| 5,828,753 A | 10/1998 | Davis | 380/49 |
| 5,844,986 A | 12/1998 | Davis | 380/4 |
| 6,138,236 A * | 10/2000 | Mirov et al. | 713/200 |
| 6,401,208 B2 * | 6/2002 | Davis et al. | 713/187 |
| 6,418,444 B1 * | 7/2002 | Raduchel et al. | 707/103 Z |

* cited by examiner

*Primary Examiner*—Justin T. Darrow
(74) *Attorney, Agent, or Firm*—Blakley, Sokoloff, Taylor & Zafman LLP

(57) ABSTRACT

An electronic system and corresponding method for authenticating firmware stored in a memory element external to a processor. In one embodiment, an electronic system comprises a processor and a memory element. The memory element is used to contain firmware and a digital signature of the firmware signed by a signatory. Coupled to the memory element, the processor authenticates the firmware during a predetermined condition, which occurs prior to execution of the firmware, through use of a pre-stored public key of the signatory and a pre-stored digital signature function.

17 Claims, 5 Drawing Sheets

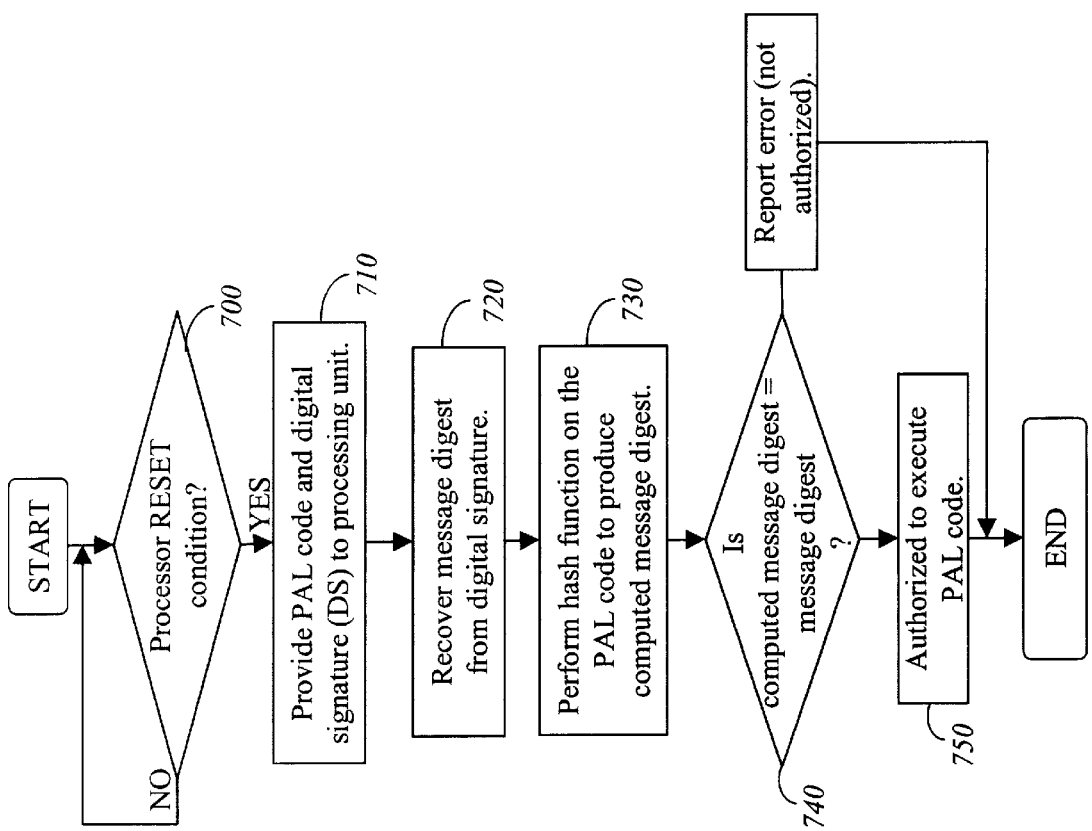

SYSTEM AND METHOD FOR AUTHENTICATION OF OFF-CHIP PROCESSOR FIRMWARE CODE

BACKGROUND

1. Field

This invention relates to the field of data security. More particularly, the invention relates to an apparatus and method for authenticating code that is stored off-chip.

2. Related Art

Normally, one of the most critical elements for an electronic device is its processor. In general, a processor is an embedded controller that comprises an integrated circuit (IC) including processing logic and on-chip memory. Memory is considered to be "on-chip" if placed on a die forming the IC. For 32-bit Intel® microprocessor architectures (e.g., Intel® IA-32 processors), all architecture functionality is implemented on-chip using a combination of hardware and microcode stored in the on-chip memory.

With the development of 64-bit Intel® microprocessor architectures (e.g., Intel® IA-64 processors), some firmware code involving non-performance critical architecture functionality is being considered for off-chip implementation. The use of off-chip firmware code provides a number of advantages.

One advantage is that the current die size constraints associated with IA-32 processors can be maintained or even reduced for subsequent generation technologies. For instance, additional run-time services can be added without increasing the size of the on-chip memory, and hence the die size of the processor. Another advantage is that the overall performance of the processor can be enhanced. This is due to the fact that a lesser amount of architecture functionality is required to be placed in on-chip memory so that more die area is available for processing logic.

However, the use of off-chip firmware code offers disadvantages as well. For instance, when moving architectural functionality off-chip, the firmware code is more susceptible to corruption and other malicious attacks.

Hence, it would be desirable to develop an electronic system and method of operation which ensure that the firmware code is free from corruption or unauthorized replacement. Also, the electronic system and method would ensure that the firmware code originated from a particular source.

SUMMARY OF THE INVENTION

Briefly, one embodiment of the invention relates to an electronic system comprising a memory element to contain firmware and a digital signature of the firmware signed by a signatory. The electronic system further comprises a processor, coupled to the memory element, to authenticate the firmware during a predetermined condition and prior to execution of the firmware through use of a pre-stored public key of the signatory and a pre-stored digital signature function.

BRIEF DESCRIPTION OF THE DRAWINGS

The features and advantages of the present invention will become apparent from the following detailed description of the present invention in which:

FIG. 7 is a second embodiment of an authentication scheme performed by the processing unit before executing code stored on the off-chip memory element.

DETAILED DESCRIPTION

Figure 1:
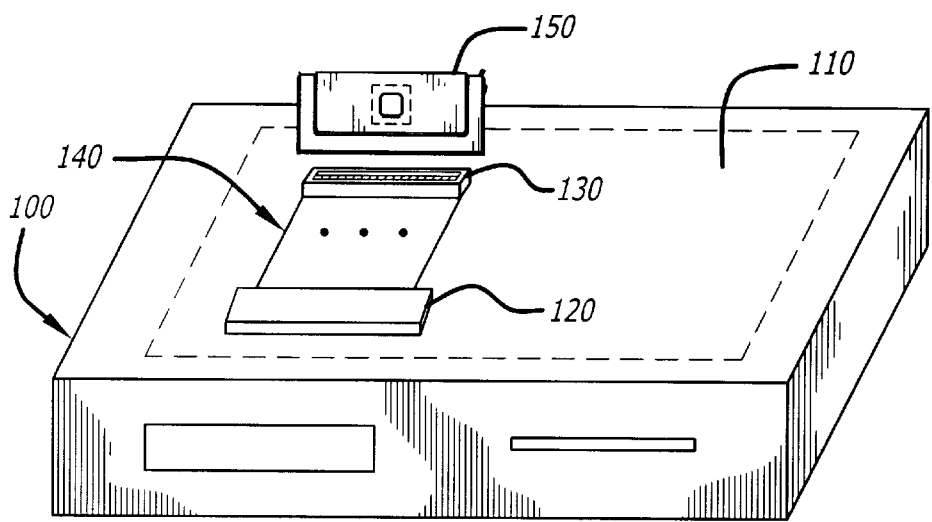
FIG. 1 is an illustrative embodiment of an electronic system.

The present invention relates to an electronic system and corresponding method for authenticating code that is stored off-chip. Herein, certain embodiments of the invention are set forth in order to provide a thorough understanding of the invention. These embodiments should not be construed as a restriction on the scope of the invention. Also, to avoid unnecessarily obscuring the present invention, certain well-known hardware and techniques are not set forth in detail In the following description, terminology is used to discuss certain features of the present invention. For example, an "electronic system" is defined as any hardware having a processor. Examples of an electronic system include, but are not limited or restricted to the following: computer (e.g., laptop, desktop, hand-held, server, mainframe, etc.), imaging equipment (e.g., printer, facsimile machine, scanner, digital camera, etc.), set-top box (e.g., television control box for cable or satellite transmissions), wireless communication equipment (e.g., cellular phone, pager, etc.), consumer electronic appliance and the like. A "processor" includes logic capable of processing information such as a microprocessor, a microcontroller, a state machine and the like. A "bus" is generally defined as a medium over which information may be transferred such as, for example, one or more electrical wire(s), fiber optic(s), cable(s), plain old telephone system (POTS) line(s), wireless channel(s) (e.g., satellite, radio frequency "RF", infrared, etc.) or even one or more logical links. "Information" is defined as data, address, control or any combination thereof.

With respect to cryptography related terminology, the term "secure" generally indicates a state where it is extremely difficult for an unauthorized individual to access information in a plain text format. For example, memory is "secure" if it is physically inaccessible when placed in the electronic system or its contents have been previously authenticated. A "key" is generally defined as an encoding and/or decoding parameter usually structured as a sequence of binary data.

A "digital signature" includes digital information signed with a private key of its signatory in accordance with a digital signature function. For clarity, one type of digital signature function described herein is the Digital Signature Algorithm (DSA) set forth in a 1998 publication entitled "Federal Information Processing Standards Publication 1861-1" (Dec. 15, 1998). A digital signature is used to ensure that the digital information has not been illicitly modified after being digitally signed. This digital information may be provided in its entirety or in part after undergoing a one-way hash function. The "one-way hash function" includes a function, mathematical or otherwise, that converts information from a variable-length to a fixed-length (referred to as a "message digest"). The term "one-way" indicates that there does not readily exist an inverse function to recover any discernible portion of the original information from the fixed-length digest. Examples of a hash function include MD2 or MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

In addition, a "digital certificate" includes digital information used to authenticate a sender of information. For example, a digital certificate may include information concerning a person or entity being certified that is encrypted with the private key of a certification authority. Examples of a "certification authority" include an original equipment manufacturer (OEM), a software vendor, a trade association, a governmental entity, a bank or any other trusted business or person.

Figure 6:
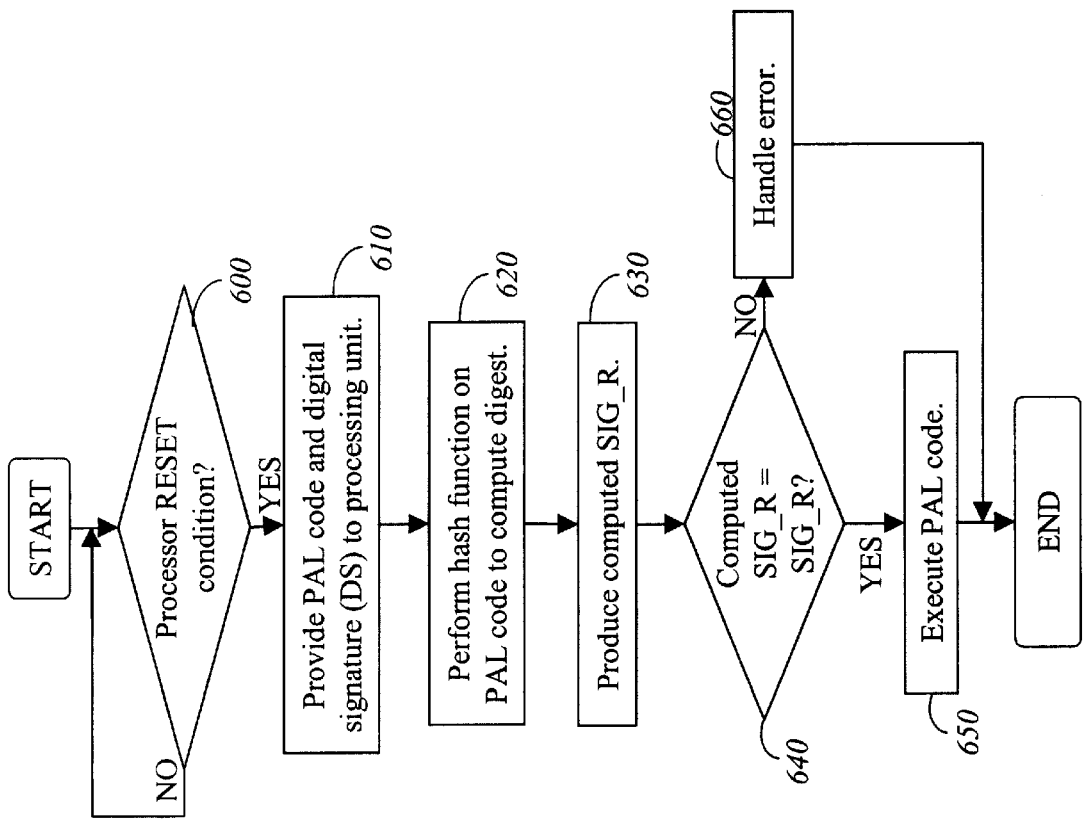
FIG. 6 is a first embodiment of an authentication scheme performed by the processing unit before executing code stored on the off-chip memory element.

Referring to FIG. 1, an illustrative embodiment of an electronic system 100 operating in accordance with an authentication scheme described in FIGS. 6 and 7. Electronic system 100 (e.g., a computer as shown) includes a system substrate 110 that controls the overall functionality of electronic system 100. Normally formed as a circuit board, system substrate 110 comprises a memory element 120 and a connector 130.

In this embodiment, memory element 120 includes non-volatile memory such as Read Only Memory (ROM), any type of erasable programmable ROM (EPROM), flash memory and the like. It is contemplated, however, that various types of volatile memory could be used (e.g., battery-backed random access memory). Memory element 120 is placed on system substrate 110 and is coupled to a bus 140. Bus 140 is routed to connector 130 in order to establish communications between memory element 120 and a processing unit 150 coupled to connector 130. Although connector 130 is shown as a standard female edge connector, any other style of connector may be used (e.g., a socket, lead frame, a solder footprint, etc.).

Figure 2:
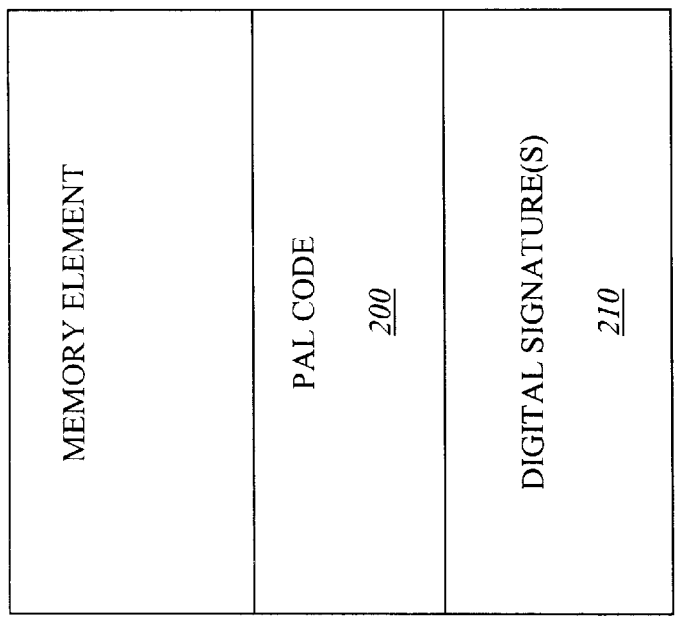
FIG. 2 is an illustrative embodiment of the off-chip memory element of the electronic system of FIG. 1.

Referring now to FIG. 2, contents of memory element 120 include Processor Abstraction Layer (PAL) code 200 and a digital signature 210 of PAL code 200. PAL code 200 comprises firmware that controls functionality of processing unit 150 but is not highly dependent on processor execution speed. For example, PAL code 200 may include (i) a processing unit reset function, (ii) a check function for internal initialization events, (iii) platform management interrupt code that allows the platform to interrupt the processing unit and the like. Before execution of PAL code 200, processing unit 150 would need to authenticate the origination and integrity of PAL code 200 before its execution.

Figure 3:
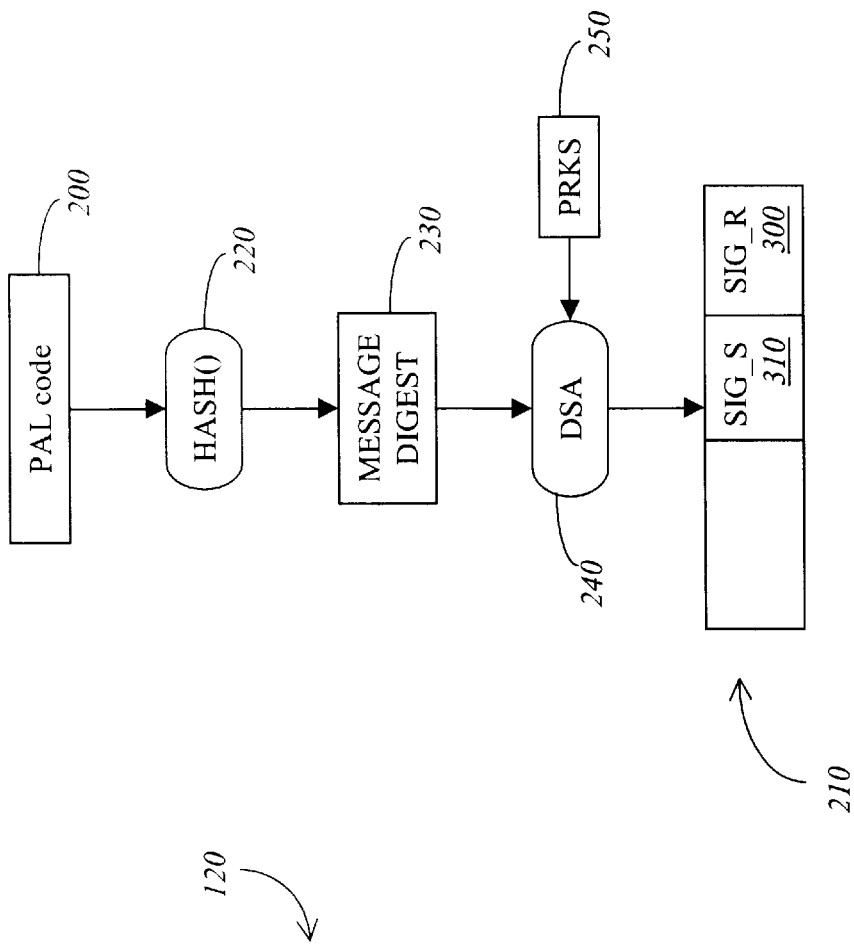
FIG. 3 is an illustrative embodiment of the formation of the digital signature contained in the off-chip memory element of FIG. 2.

Digital signature 210 is used to authenticate PAL code 200. As shown in FIG. 3, in accordance with DSA, digital signature 210 includes a pair of numbers SIG_R 300 and SIG_S 310. In particular, the following equations are used to compute SIG_R 300 and SIG_S 310:

$SIG\_R = (g^k \bmod p) \bmod q;$ $SIG\_S = (k^{-1}(SHA\text{-}1(M) + xr)) \bmod q;$ where "p" =prime modulus, where $2^{L-1} < p < 2^L$ for $512 < L < 1024$ and "L" is a multiple of 64, "q" =a prime divisor of p−1, where $2^{159} < q < 2^{160}$, "g" =$h^{(p-1)/q}$ mod p, where "h" is any integer with $1 < h < p-1$ such that $h^{(p-1)/q}$ mod $p > 1$, "x" =private key (PRKS)=a randomly or pseudorandomly generated integer with $0 < x < q$, "y" =$g^x$ mod p, "k" public key (PUKS)=a randomly or pseudorandomly generated integer with $0 < k < q$, and "SHA-1(M)" is a message digest of word block M.

Using DSA, digital signature 210 is computed by conducting a hash operation on PAL code 200 using a predetermined one-way hash function 220 to produce a message digest 230. In this embodiment, "message digest" 230 is a 160-bit representation of PAL code 200 and SHA-1 is used as the hash function. It is contemplated, however, that message digest 230 may be of a different bit size and a different hash function may be used. Message digest 230 is signed using DSA 240 and a private key of a signatory (PRKS) 250 in order to produce digital signature 210. In one embodiment, the manufacturer of the processing unit 150 (e.g., Intel Corporation) may be the signatory. Other examples include an original equipment manufacturer (OEM) of the electronic system, the OEM of the system substrate, the OEM of the memory element or any other person or entity assuming the responsibility in providing digital signature 210 to the memory element.

Figure 4:
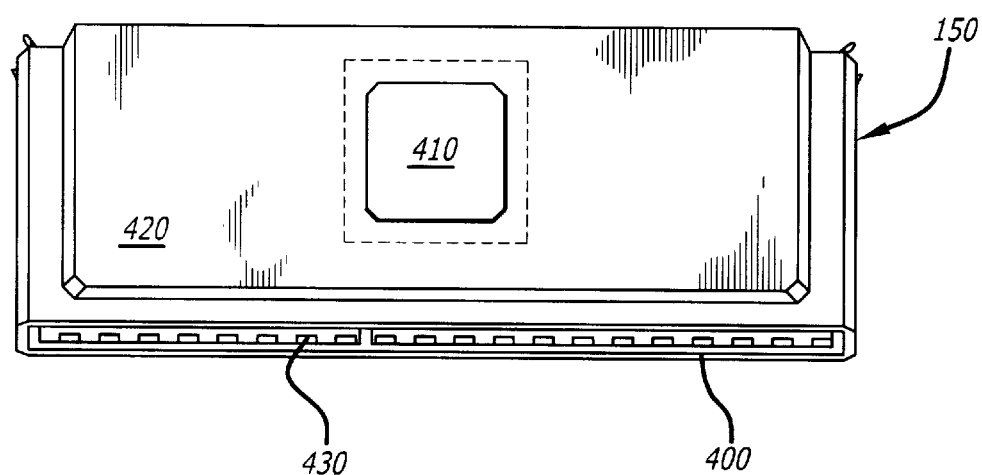
FIG. 4 is a first illustrative embodiment of the processing unit of the electronic system of FIG. 1.

Referring to FIG. 4, a first illustrative embodiment of processing unit 150 is shown. In this embodiment, processing unit 150 includes a processor substrate 400 formed from any type of material upon which integrated circuit components (not shown) can be attached through well-known techniques (e.g., solder connection, etc.). Herein, a processor 410 is placed on processor substrate 400. As shown, processor 410 includes a single microprocessor as described in FIG. 5, but multiple microprocessors may be placed on processor substrate 400. Processor substrate 400 is substantially covered by a package 420, preferably made of hardened plastic, in order to protect processor 410 from damage or harmful contaminants. However, a connector 430, preferably adapted to establish a mechanical and electrical connection with connector 130 of FIG. 1, protrudes from package 420. As shown, connector 430 includes any type of connector which mates with connector 130.

Figure 5:
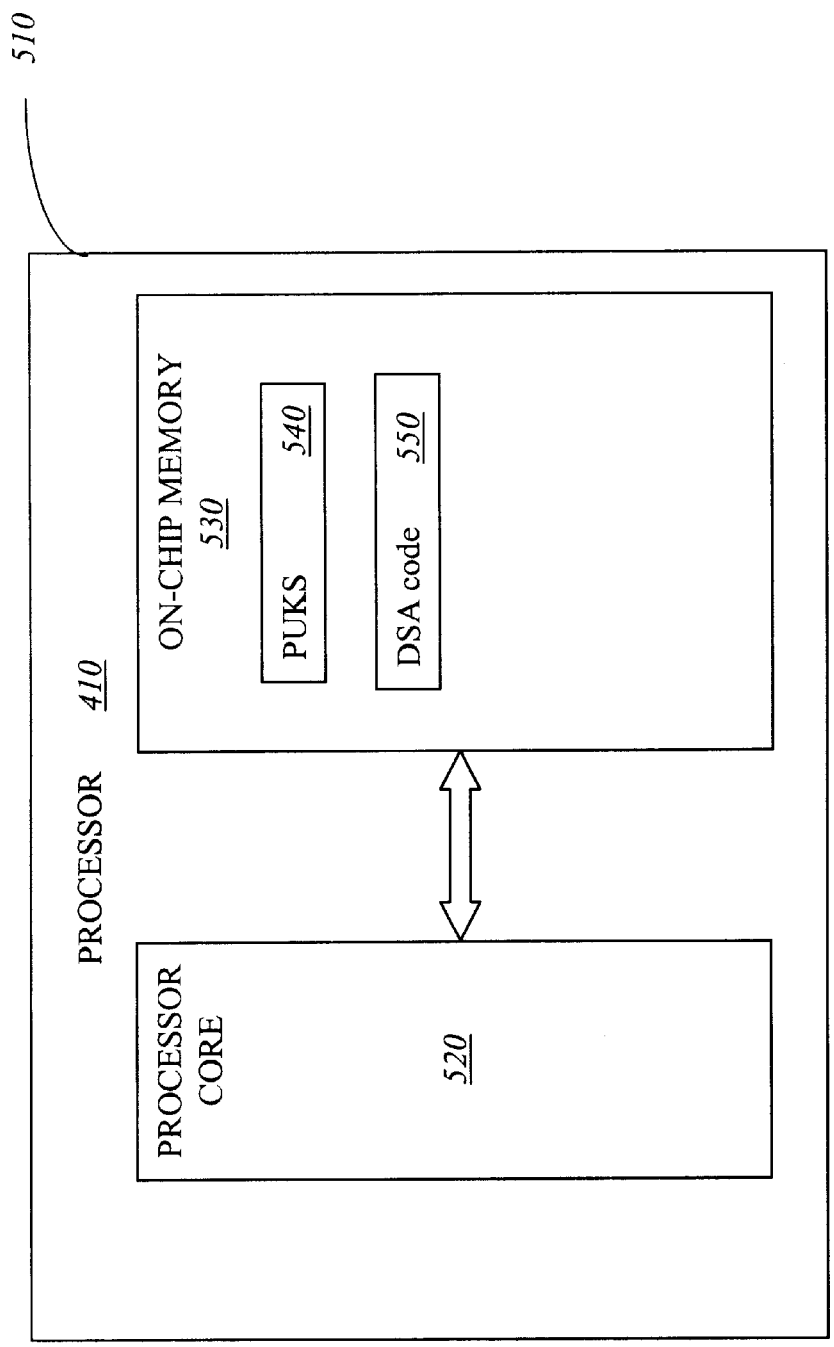
FIG. 5 is a second illustrative embodiment of the processing unit of the electronic system of FIG. 1.

Referring now to FIG. 5, a second illustrative embodiment of processing unit 150 is shown. In this embodiment, processing unit 150 simply includes processor 410 being an integrated circuit (IC) 500 substantially covered by an IC package 510. IC 500 includes processing logic (e.g., a processor core) 520 and local memory 530 (e.g., on-chip memory). IC package 510 is configured to protect IC 500 from damage or harmful contaminants. The structure of IC package 510 is selected for adaptation with connector 130. Local memory 530 contains a public key of a signatory (PUKS) 540 and DSA code 550 for verifying the integrity of the PAL code 200 and authenticating the identity of the signatory. As an alternative embodiment, PUKS 540 and DSA code 550 could be stored in local memory such as secure off-chip memory.

Referring to FIG. 6, a general diagram of an embodiment of operations performed by processor 410 to authenticate PAL code 200 is shown. In response to a processor reset condition, the PAL code and the digital signature are loaded into the processor (blocks 600 and 610). The PAL code undergoes a hash operation, using the hash function that produced message digest 230 of FIG. 3, in order to produce a digest (block 620). This digest undergoes operations in combination with PUKS and public DSA based parameters (p, q and g) to produce a computed SIG_R value (block 630). The computations are set forth in the equation shown below.

$W = (SIG\_S)^{-1} \bmod q$ $u1 = ((SHA-1(M))w) \bmod q$, where "M" = the received version of the PAL code.

$u2 = ((SIG\_R)w) \bmod q$ $V$ = computed SIG\_R = $(((g)^{u1}(y)^{u2}) \bmod p) \bmod q$ where: SIG_R, SIG_S are received versions of the digital signature 210.

Thereafter, the computed SIG_R value is compared with SIG_R from digital signature 210 of FIG. 2 (block 640). If a match occurs, namely a determination that both values are identical within a predetermined percentage or error (e.g., less than one percent), the PAL code has been authenticated and the identification of the signatory has been confirmed (block 650). If a match does not occur, an error is reported and/or the PAL code is prevented from being executed. This can be accomplished by placing the processor in an infinite loop, placing the processor into a SLEEP mode and the like (block 660).

Referring to FIG. 7, a general diagram of alternative operations performed by processor 410 to authenticate the PAL code is shown. In response to a processor reset condition, the PAL code and the digital signature are provided to the processor (block 700 and 710). The message digest of the digital signature is retrieved using the DSA code and PUKS pre-loaded into on-chip memory (block 720). Also, the PAL code undergoes a hash operation in accordance with a hash function identical to that used to create the digital signature. This produces a secondary message digest referred to as a "computed digest" (block 730). The computed digest is compared with message digest recovered from the digital signature (block 740). If a match is detected, the PAL code has not been modified (block 750). Thus, the PAL code may be executed. However, if a match is not detected, the electronic system is not released from the processor reset condition (RESET state) as described above (block 760).

It is contemplated that every time the PAL code is updated, the signatory will have to generate one or more new digital signature(s) and store them with the updated PAL code. PUKS will not be updated unless its corresponding key pair, namely PRKS, changes.

While this invention has been described with reference to illustrative embodiments, this description should not be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An electronic system comprising:
   a system substrate;
   a memory element coupled to the system substrate, the memory element to contain firmware and a digital signature of the firmware signed by a signatory, the digital signature including a first value and a second value; and
   a processor coupled to the system substrate and the memory element, the processor to contain a public key of the signatory and a digital signature function used during a predetermined condition to authenticate the firmware before execution by the processor, the processor authenticates the firmware by (i) performing a hash operation on the firmware to produce a message digest, (ii) using at least the message digest, the public key of the signatory and a plurality of parameters associated with the digital signature function to produce a computed first value, (iii) comparing the computed first value to the first value of the digital signature, and (iv) allowing the firmware to be executed by the processor where the computed first value matches the first value of the digital signature.

2. The electronic system of claim 1, wherein the predetermined condition is a processor reset condition.

3. The electronic system of claim 1, wherein the processor includes a processor core and a local memory contained in an integrated circuit package.

4. The electronic system of claim 3, wherein the local memory is on-chip memory situated on a same integrated circuit chip as the processor core.

5. The electronic system of claim 1, wherein the firmware controls the functionality of the processor.

6. The electronic system of claim 5, wherein the firmware includes a processing unit reset function.

7. The electronic system of claim 5, wherein the firmware includes one of a function for checking an occurrence of an internal initialization event and a function enabling the electronic system to interrupt the processor.

8. The electronic system of claim 1, wherein the plurality of parameters include a prime modulus (p) and a prime divisor (q).

9. An electronic system:
   a memory element to contain firmware and a digital signature of the firmware signed by a signatory, the digital signature includes a first value and a second value; and
   a processor, coupled to the memory element, to authenticate the firmware during a predetermined condition and prior to execution of the firmware through use of a pre-stored public key of the signatory and a pre-stored digital signature function, the processor authenticates the firmware by (i) performing a hash operation on the firmware to produce a message digest, (ii) using at least the message digest, the public key of the signatory and a plurality of parameters associated with the digital signature function to produce a computed first value, (iii) comparing the computed first value to the first value of the digital signature, and (iv) allowing the firmware to be executed by the processor where the computed first value matches the first value of the digital signature.

10. The electronic system of claim 9, wherein the digital signature function pre-stored in the processor includes a Digital Signature Standard (DSS) function.

11. The electronic system of claim 9, wherein the predetermined condition is a processor reset condition.

12. The electronic system of claim 9, wherein the processor includes a processor core and a local memory contained in a package.

13. The electronic system of claim 9, wherein the firmware controls the functionality of the processor.

14. The electronic system of claim 13, wherein the firmware includes a processing unit reset function.

15. The electronic system of claim 9, wherein the plurality of parameters include a prime modulus (p) and a prime divisor (q).

16. A method comprising:
    undergoing a reset condition by a processor;
    accessing firmware from a memory element remotely located from the processor;
    authenticating the firmware before execution by the processor by performing a hash operation on the firmware to produce a message digest, (ii) using at least the message digest, a public key of a signatory to produce a computed value, (iii) comparing the computed value to a value stored within the digital signature, and (iv) allowing the firmware to be executed by the processor where the computed value matches the value stored within the digital signature; and allowing the processor to execute the firmware once the firmware has been authenticated.

17. A machine readable medium having embodied thereon a program for processing by a processor of an electronic system, the program comprising:

an authentication subprogram for authenticating firmware loaded into the processor from a memory element remotely located from the processor using a pre-stored public key and a pre-stored digital signature function by performing a hash operation on the firmware to produce a message digest, (ii) using at least the message digest, the pre-stored public key to produce a computed value, (iii) comparing the computed value to a value stored within the digital signature, and (iv) allowing the firmware to be executed by the processor where the computed value matches the value stored within the digital signature;

a processor reset subprogram to release the processor from a RESET state so that the processor can execute the firmware if authenticated; and an error subprogram to report an authentication error and to prevent the firmware from being executed.

* * * * *